(12) United States Patent
Almeida

(10) Patent No.: US 9,744,611 B2
(45) Date of Patent: Aug. 29, 2017

(54) SOLDER RECOVERY UNIT

(71) Applicant: ANTAYA TECHNOLOGY CORPORATION, Cranston, RI (US)

(72) Inventor: Fernando Almeida, Rehoboth, MA (US)

(73) Assignee: Antaya Technologies Corporation, Warwick, RI (US)

( * ) Notice: Subject to any disclaimer, the term of this patent is extended or adjusted under 35 U.S.C. 154(b) by 57 days.

(21) Appl. No.: 14/955,182

(22) Filed: Dec. 1, 2015

(65) Prior Publication Data
US 2016/0082536 A1    Mar. 24, 2016

Related U.S. Application Data

(62) Division of application No. 14/023,714, filed on Sep. 11, 2013, now Pat. No. 9,228,247.

(51) Int. Cl.
| | |
|---|---|
| *B23K 1/018* | (2006.01) |
| *C22B 7/00* | (2006.01) |
| *C22B 1/00* | (2006.01) |

(52) U.S. Cl.
CPC ............ *B23K 1/018* (2013.01); *C22B 1/005* (2013.01); *C22B 7/003* (2013.01); *Y02P 10/212* (2015.11); *Y02W 30/54* (2015.05)

(58) Field of Classification Search
CPC ..................................................... B23K 1/018
(Continued)

(56) References Cited

U.S. PATENT DOCUMENTS

| | | |
|---|---|---|
| 1,362,381 A | 12/1920 | Zacharias |
| 1,527,076 A | 2/1925 | Peck |

(Continued)

FOREIGN PATENT DOCUMENTS

| | | |
|---|---|---|
| CN | 201171922 Y | 12/2008 |
| CN | 201244516 Y | 5/2009 |

(Continued)

OTHER PUBLICATIONS

Amendola, A. et al., "Centrifugal Solder Dress Process," an IP.com Prior Art Database Technical Disclosure, 2 pages, IP.com Electronic Publication Date: Feb. 13, 2005.

*Primary Examiner* — Scott Kastler
(74) *Attorney, Agent, or Firm* — Robert J. Myers

(57) ABSTRACT

A method for recovering solder from solder coated scrap pieces includes a step of containing a quantity of solder coated scrap pieces within a centrifuge receptacle of a first centrifuge. The centrifuge receptacle has perforation holes and is rotatably mounted about a first centrifuge axis. A solder collection container surrounds the centrifuge receptacle. The method further includes the steps of heating the solder coated scrap pieces and melting the solder thereon with a heater surrounding the solder collection container and with a drive system, rotating the centrifuge receptacle while the first centrifuge axis is in about a horizontal position at a low speed and tumbling the scrap pieces along a longitudinal length of the centrifuge receptacle, and later rotating the centrifuge receptacle at a high speed for centrifugally extracting molten solder from the centrifuge receptacle, radially outwardly through the perforation holes into the solder collection container.

15 Claims, 13 Drawing Sheets

(58) Field of Classification Search
USPC .......................................................... 266/204
See application file for complete search history.

(56) References Cited

U.S. PATENT DOCUMENTS

| | | |
|---|---|---|
| 1,750,364 A | 3/1930 | Schmucking |
| 1,858,669 A | 5/1932 | Hinchley |
| 1,861,878 A | 6/1932 | Quiroz |
| 3,866,893 A * | 2/1975 | Hoberman ........... B23K 1/0002 266/120 |
| 3,984,090 A | 10/1976 | Swartz |
| 5,755,889 A | 5/1998 | Johnson |
| 6,276,589 B1 | 8/2001 | Watts, Jr. et al. |
| 6,666,370 B2 | 12/2003 | McDonald |
| 7,316,062 B2 | 1/2008 | Chilcote |
| 2004/0011850 A1 | 1/2004 | Bayot et al. |
| 2005/0262967 A1 | 12/2005 | Leon |
| 2015/0068363 A1 | 3/2015 | Almeida |

FOREIGN PATENT DOCUMENTS

| | | |
|---|---|---|
| JP | H-01-168826 A | 7/1989 |
| RU | 2 089 632 C1 | 9/1997 |

* cited by examiner

SOLDER RECOVERY UNIT

CROSS-REFERENCE TO RELATED APPLICATION

This application is a divisional application and claims the benefit under 35 U.S.C. §121 of U.S. patent application Ser. No. 14/023,714 filed Sep. 11, 2013, now U.S. Pat. No. 9,228,247 issued Jan. 5, 2016.

BACKGROUND OF THE INVENTION

Electrical connectors that have a pre-soldered terminal pad can be stamped from solder clad metallic ribbons, which can include copper, brass or aluminum, or alloys thereof. The remaining solder clad scrap has very little monetary value since the scrap is coated with solder. In cases where the solder cladding is an expensive lead free solder composition, for example, a solder composition containing high levels of indium, the amount of the lead free solder on the scrap can have a high monetary value, but is almost worthless if not separated.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

The present invention can provide an apparatus for recovering solder from solder coated scrap pieces in a relatively quick and efficient manner. The apparatus can include a first centrifuge comprising a centrifuge receptacle having first perforation holes. The first centrifuge receptacle can be rotatably mounted about a first centrifuge axis for containing and rotating a first quantity of solder coated scrap pieces. A first solder collection container can surround the first centrifuge receptacle. A first heater can surround the first solder collection container for heating the first quantity of solder coated scrap pieces and melting the solder thereon. A drive system can rotate the first centrifuge receptacle. The drive system can be configured for rotating the first centrifuge receptacle while the first centrifuge axis is in about a horizontal position at a low speed that tumbles the scrap pieces along a generally horizontally oriented longitudinal length of the first centrifuge receptacle, and later rotating the first centrifuge receptacle at a high speed for centrifugally extracting molten solder from the first centrifuge receptacle, radially outwardly through the first perforation holes into the first solder collection container.

In particular embodiments, the centrifuge receptacle can be generally cylindrical. The solder collection container can be generally cylindrical and generally coaxially positioned around the centrifuge receptacle. The heater can be generally cylindrical and generally coaxially positioned around the solder collection container. The solder collection container and the heater can be both stationary. The first centrifuge can be mounted to a pivoting frame, which can pivot the first centrifuge and the first centrifuge axis between desired positions. The centrifuge receptacle can be generally cup shaped for receiving the quantity of solder coated scrap pieces through an open end. The pivoting frame can pivot the first centrifuge between a first position where the open end of the centrifuge receptacle faces upwardly, and a second position where the open end of the centrifuge receptacle and the first centrifuge axis are in about a horizontal orientation. The solder collection container can include a solder outlet at a bottom of the solder collection container from which molten solder collected within the solder collection chamber can drain. The drive system can be configured to rotate the centrifuge receptacle at about 15-30 RPM while the first centrifuge axis is in about a horizontal position, and to rotate the centrifuge receptacle at about 400-430 RPM while the first centrifuge axis is about 45° to horizontal. The centrifuge receptacle can include at least one radially inwardly directed baffle for directing scrap pieces to fall downwardly when the centrifuge receptacle is rotated at a low speed while the first centrifuge axis is in about a horizontal orientation. The perforation holes in the centrifuge receptacle can be about $1/16$ inches in diameter and can be spaced apart from each other about $3/16$ inches. The pivoting frame is capable of pivoting the first centrifuge to a third position where the open end of the centrifuge receptacle is facing downwardly, for dumping scrap pieces from the centrifuge receptacle. An openable closure member can close off the open end of the centrifuge receptacle. In some embodiments, a second centrifuge can be mounted to the pivoting frame and can include a second centrifuge receptacle having second perforation holes, that is rotatably mounted about a second centrifuge axis for containing and rotating a second quantity of solder coated scrap pieces. A second solder collection container can surround the second centrifuge receptacle. A second heater can surround the second solder collection container for heating the second quantity of solder coated scrap pieces and melting the solder thereon. The drive system can rotate the centrifuge receptacle of the second centrifuge in a direction opposite to the centrifuge receptacle of the first centrifuge, for dynamic balancing.

The present invention can also provide an apparatus for recovering solder from solder coated scrap pieces, and can include a first centrifuge comprising a generally cylindrical centrifuge receptacle having perforation holes, rotatably mounted about a first centrifuge axis for containing and rotating a quantity of solder coated scrap pieces. A stationary generally cylindrical solder collection container can be generally coaxially positioned around the centrifuge receptacle. A stationary generally cylindrical heater can be generally coaxially positioned around the solder collection container for heating the solder coated scrap pieces and melting the solder thereon. The first centrifuge can be mounted to a pivoting frame for pivoting the first centrifuge between one position where the first centrifuge axis is in about a horizontal position, and another position where the first centrifuge axis is at about 45° to horizontal. A drive system can rotate the centrifuge receptacle. The drive system can be configured for rotating the centrifuge receptacle at about 15-30 RPM while the first centrifuge axis is in about a horizontal position, to tumble the scrap pieces along a generally horizontally oriented longitudinal length of the centrifuge receptacle, and later rotating the centrifuge receptacle at about 400-430 RPM while the first centrifuge axis is at about 45° to horizontal for centrifugally extracting molten solder from the centrifuge receptacle, radially outwardly through the perforation holes into the solder collection container.

The present invention can also provide a method of recovering solder from solder coated scrap pieces, comprising containing a first quantity of solder coated scrap pieces within a first centrifuge receptacle of a first centrifuge. The first centrifuge receptacle can have first perforation holes and can be rotatably mounted about a first centrifuge axis. A first solder collection container can surround the centrifuge receptacle. The first quantity of solder coated scrap pieces can be heated and the solder thereon melted with a first heater surrounding the first solder collection container. A drive system can rotate the first centrifuge receptacle while the first centrifuge axis is in about a horizontal position, at a low speed and tumble the scrap pieces along a generally horizontally oriented longitudinal length of the first centrifuge receptacle, and later rotate the first centrifuge receptacle at a high speed for centrifugally extracting molten solder from the first centrifuge receptacle, radially outwardly through the first perforation holes into the first solder collection container.

In particular embodiments, the centrifuge receptacle can be formed to be generally cylindrical. The solder collection container can be generally cylindrical and generally coaxially positioned around the centrifuge receptacle. The heater can be generally cylindrical and generally coaxially positioned around the solder collection container. The solder collection container and the heater can both be stationary. The first centrifuge and the first centrifuge axis can be pivoted between desired positions with a pivoting frame to which the first centrifuge can be mounted. The centrifuge receptacle can be formed to be generally cup shaped for receiving the quantity of solder coated scrap pieces through an open end. The pivoting frame can be capable of pivoting the first centrifuge between a first position where the open end of the centrifuge receptacle faces upwardly, and a second position where the open end of the centrifuge receptacle and the first centrifuge axis are in about a horizontal orientation. Molten solder collected within the solder collection chamber can drain through a solder outlet at a bottom of the solder collection container. The centrifuge receptacle can be rotated at about 15-30 RPM while the first centrifuge axis is in about a horizontal position, and then be rotated at about 400-430 RPM while the first centrifuge axis is at about 45° to horizontal. Scrap pieces can be directed to fall downwardly when the centrifuge receptacle is rotated at a low speed while the first centrifuge axis is in about a horizontal orientation with at least one radially inwardly directed baffle within the centrifuge receptacle. The perforation holes can be formed in the centrifuge receptacle about 1/16 inches in diameter and about 3/16 inches apart from each other. The first centrifuge can be pivoted to a third position where the open end of the centrifuge receptacle is facing downwardly, for dumping scrap pieces from the centrifuge receptacle. The open end of the centrifuge receptacle can be closed off with an openable closure member. In some embodiments, a second centrifuge can be mounted to the pivoting frame and include a second centrifuge receptacle having second perforation holes, rotatably mounted about a second centrifuge axis for containing and rotating a second quantity of solder coated scrap pieces. A second solder collection container can surround the second centrifuge receptacle. A second heater can surround the second solder collection container for heating the second quantity of solder coated scrap pieces and melting the solder thereon. The drive system can rotate the centrifuge receptacle of the second centrifuge in a direction opposite to the centrifuge receptacle of the first centrifuge, for dynamic balancing.

The present invention can also provide a method for recovering solder from solder coated scrap pieces comprising containing a quantity of solder coated scrap pieces within a generally cylindrical centrifuge receptacle of a first centrifuge. The centrifuge receptacle can have perforation holes and can be rotatably mounted about a first centrifuge axis. A stationary generally cylindrical solder collection container can be generally coaxially positioned around the centrifuge receptacle. The solder coated scrap pieces can be heated and the solder thereon melted, by a stationary generally cylindrical heater generally coaxially positioned around the solder collection container. The first centrifuge can be pivoted between one position where the first centrifuge axis is in about a horizontal position, and another position where the first centrifuge axis is at about 45° to horizontal, with a pivoting frame to which the first centrifuge is mounted. A drive system can rotate the centrifuge receptacle at about 15-30 RPM while the first centrifuge axis is in about a horizontal position, and tumble the scrap pieces along a generally horizontally oriented longitudinal length of the centrifuge receptacle, and later rotate the centrifuge receptacle at about 400-430 RPM while the first centrifuge axis is at about 45° to horizontal for centrifugally extracting molten solder from the centrifuge receptacle, radially outward through the perforation holes into the solder collection container.

BRIEF DESCRIPTION OF THE SEVERAL VIEWS OF THE DRAWING

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a front perspective view of the centrifuges, one with the door or cover removed, and one with the cover on;

DETAILED DESCRIPTION OF THE INVENTION

Figure 1:
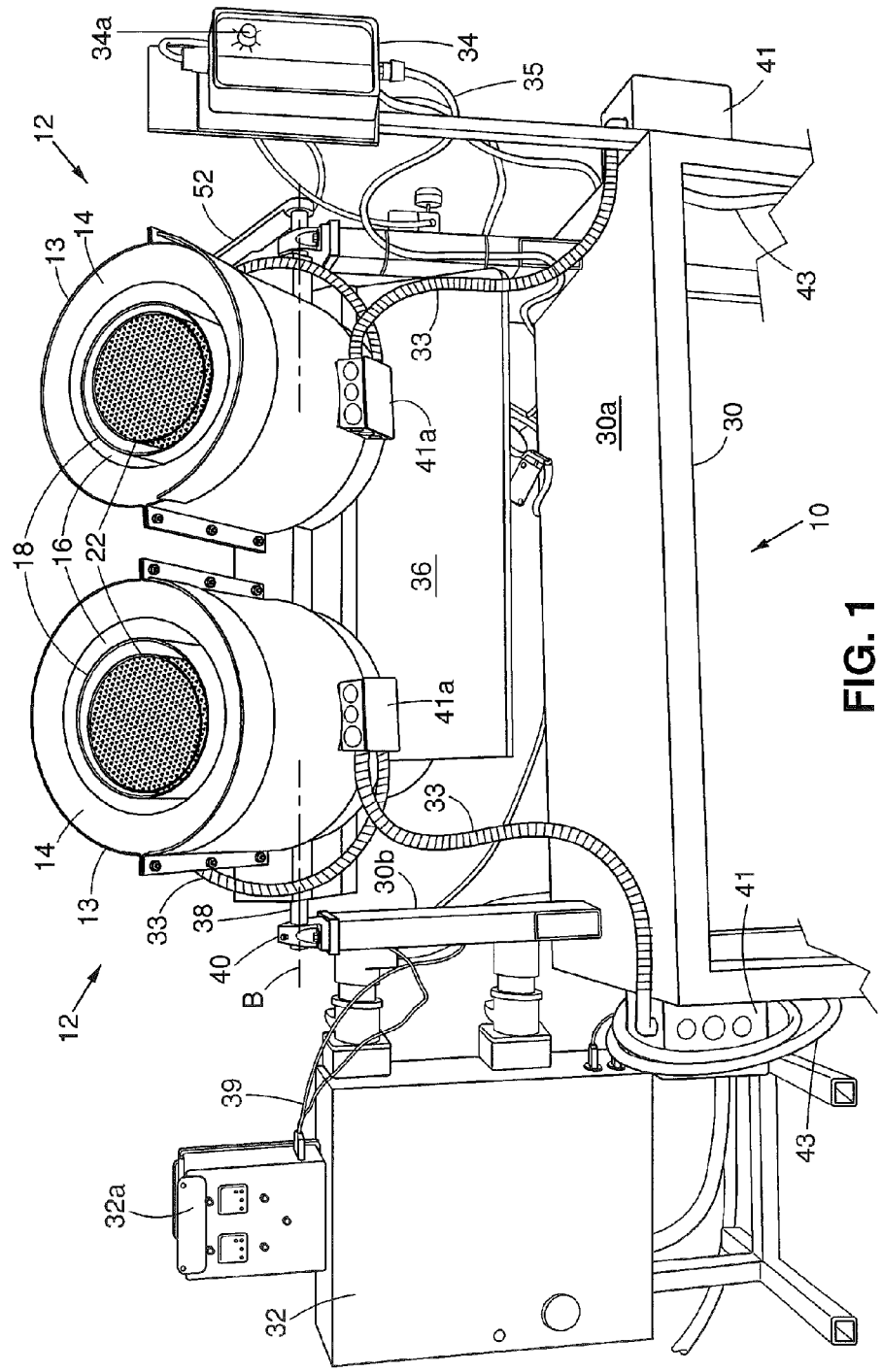
FIG. 1 is a front perspective view of an embodiment of a solder recovery unit in the present invention.
Figure 3:
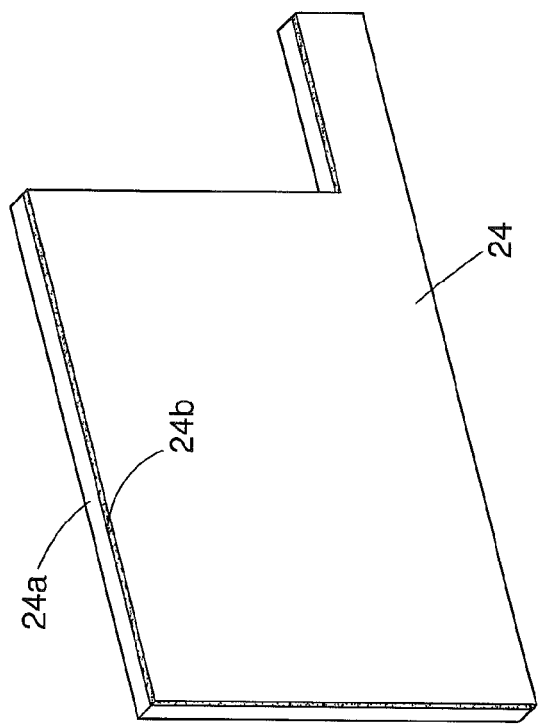
FIG. 3 is a schematic drawing of a piece of solder coated scrap.
Figure 2:
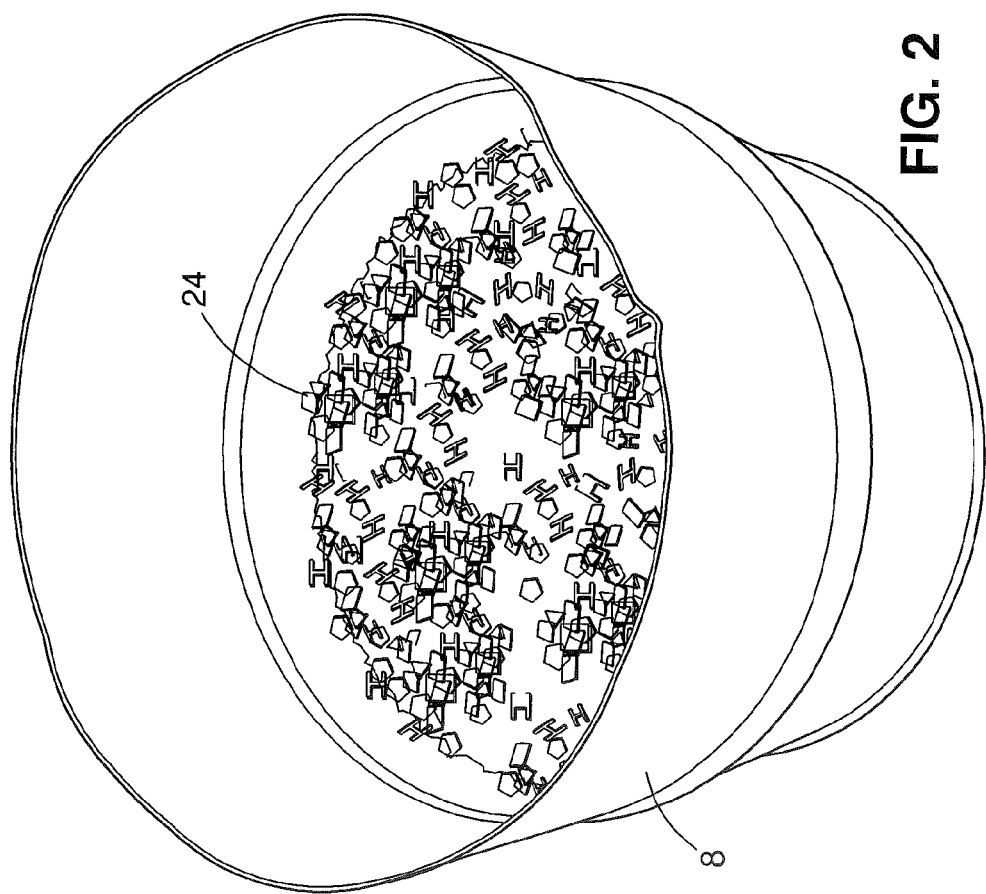
FIG. 2 is a perspective view of a barrel of solder coated scrap pieces.

Referring to FIG. 1, solder recovery apparatus, assembly, machine, device or unit 10 is an embodiment in the present invention which can recover solder from solder coated or clad scrap pieces 24 such as solder coated metals. FIG. 2 depicts a barrel 8 containing a quantity of solder coated scrap pieces 24, for example, resulting from a stamping process, where a solder coated or clad metallic ribbon, is stamped to form electrical components having pre-soldered terminal pads. The metallic ribbon from which the base metal of the scrap pieces 24 is formed, can be, for example, copper, brass, aluminum, steel, or alloys thereof, etc., which can be clad or plated with various desired metals or materials, before being coated with solder. FIG. 3 shows a solder coated scrap piece 24, having a base material or metal 24*a* on which a layer of solder 24*b* is coated or clad. Typically, the layer of solder 24*b* is formed of a solder composition that has a much lower melting temperature than the base metal 24*a*. The solder composition can be leaded solder or can be nonleaded solder. An example of a nonleaded solder composition, can be for example, 65% indium, 30% tin, 4.5% silver and 0.5% copper, with a liquidus of about 121° C. (250° F.). The scrap pieces 24 can often include small flat pieces of sheet metal within about an inch of lateral size, with a thickness in the range of about 1/32 to 1/16 inches thick, but other sizes are possible.

Figure 7:
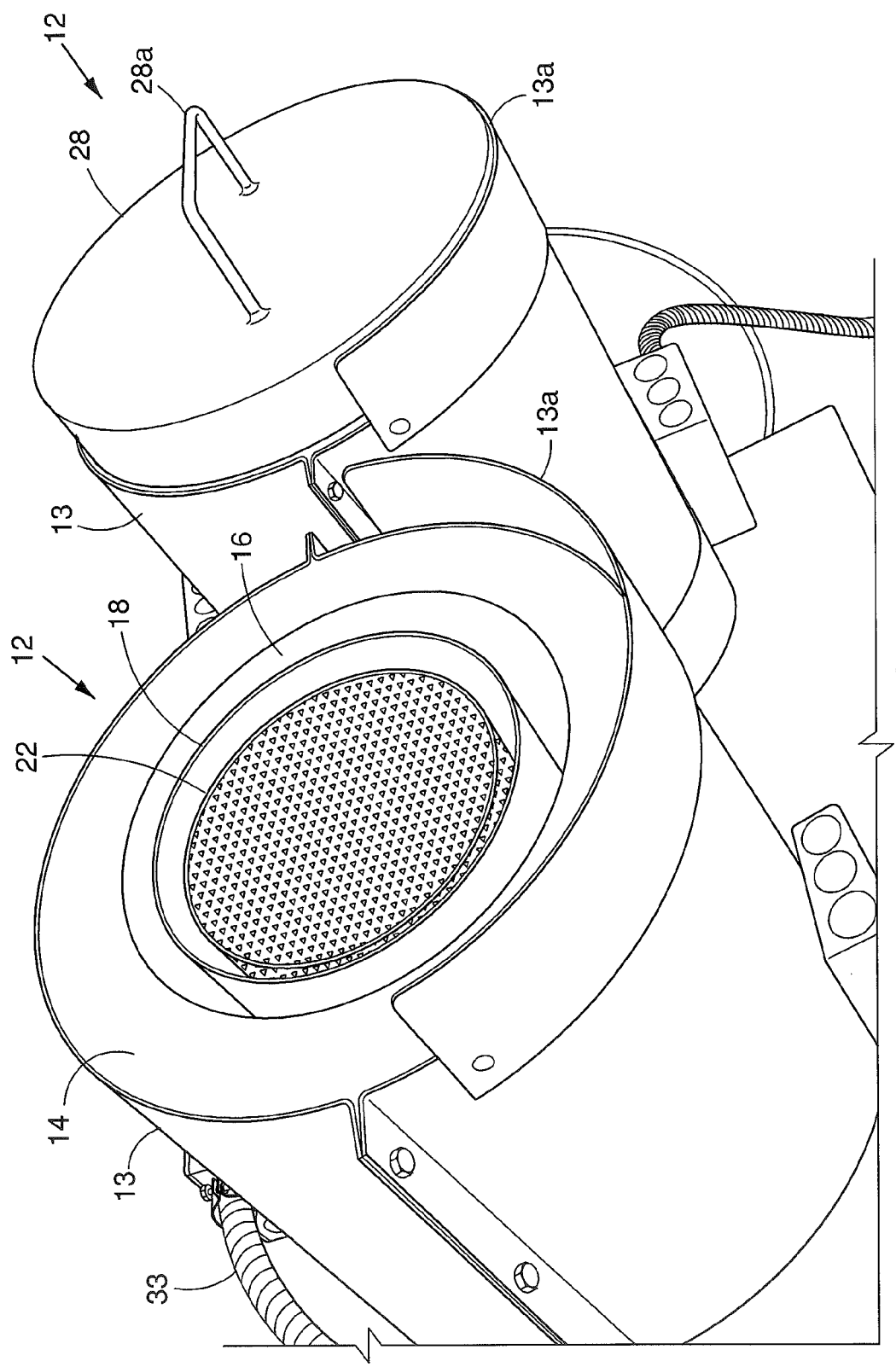
Figure 8:
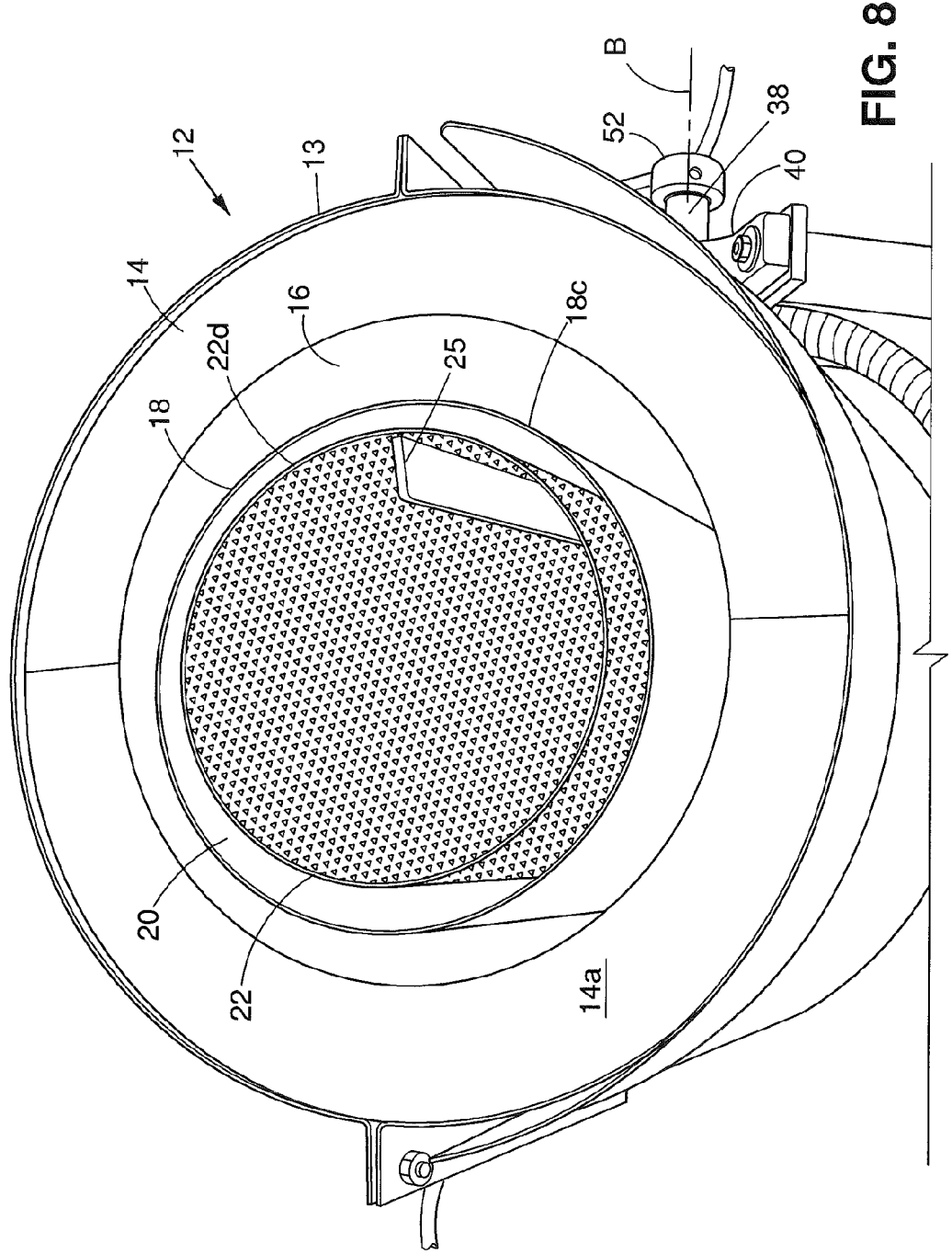
FIG. 8 is a perspective view looking into one centrifuge.
Figure 9:
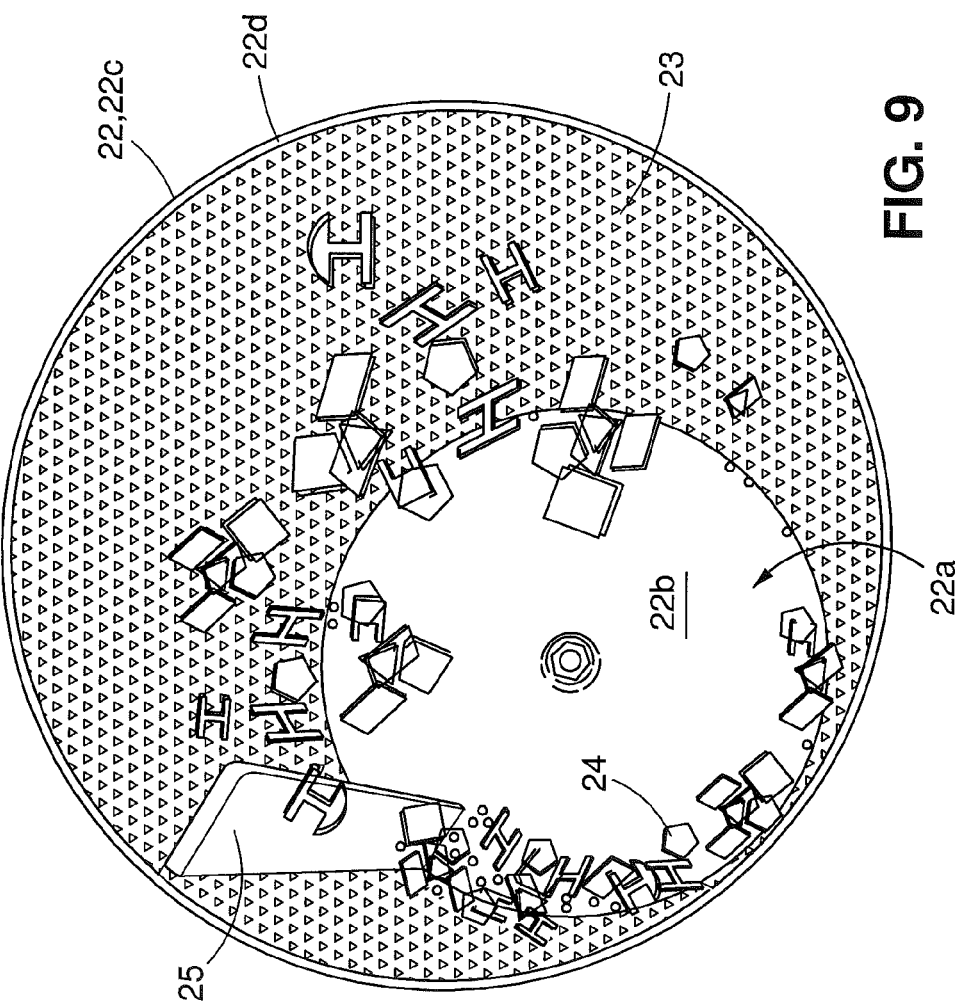
FIG. 9 is a perspective view looking into a centrifuge receptacle.
Figure 10:
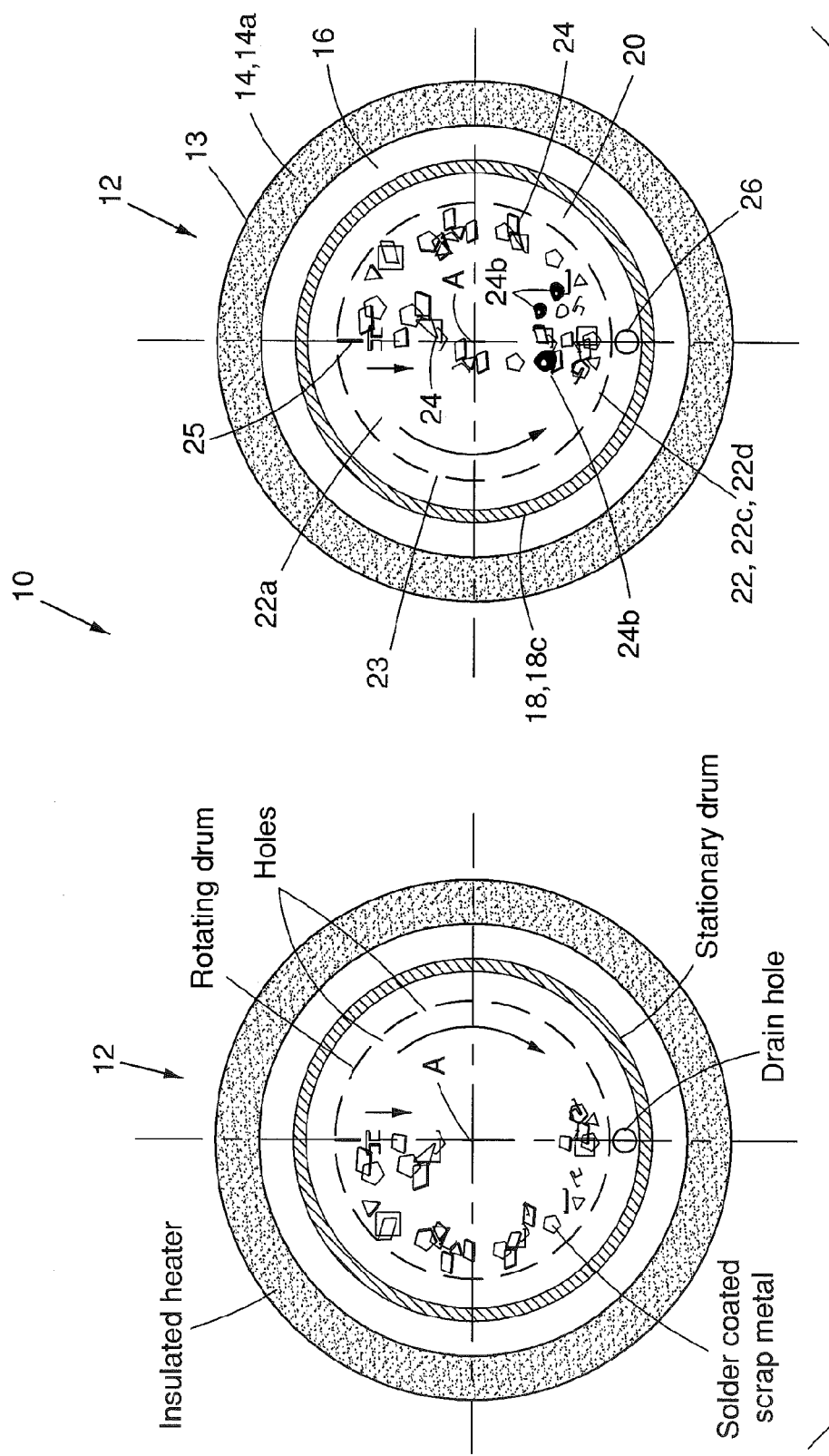
FIG. 10 is a schematic drawing of the two centrifuges.

The solder recovery unit 10 can include at least one centrifuge 12, with two being shown. The two centrifuges 12 can be mounted or secured to a pivot, pivoting, rotatable, or pivotable frame 36, that is pivotably or rotatably mounted or coupled between two frame members or posts 30*b* of a base frame 30 along a horizontal axis B by shafts 38 and bearings 40 at opposite ends of frame 36. The posts 30*b* can extend upwardly from a table portion 30*a* of base frame 30. Referring to FIGS. 1 and 4-11, each centrifuge 12 can include an inner or central generally cup shaped cylindrical or circular centrifuge member, rotor, drum, barrel or receptacle 22, rotatably secured, coupled or mounted about its own centrifuge axis A (FIGS. 10 and 11), for receiving, containing and rotating a quantity of solder coated scrap pieces 24 within the interior 22*a*, to rotationally or centrifugally extract molten solder from the scrap pieces 24. The centrifuge receptacle 22 can have a generally circular or cylindrical side or outer wall 22*c* and a generally flat lower, bottom or end wall 22*b*. The outer wall 22*c* can be formed of a thin walled metal tube or of sheet metal, with a continuous series or pattern of extraction perforations, openings, or holes 23 formed therethrough, extending around the perimeter and along the longitudinal length to allow molten solder 24*b* to flow radially outwardly through the holes 23, and which can be a screen or grate. In some embodiments, at least one inwardly directed, paddle, wall, partition, or baffle 25 can extend a short distance, such as 1/6 the diameter of the outer wall 22*c*, radially inwardly from the outer wall 22*c* along the longitudinal length of the outer wall 22*c*, for directing, aiding or promoting tumbling of the scrap pieces 24 at low rotational speeds (FIGS. 9 and 10).

A stationary generally cylindrical, circular or annular solder collection, containment or extraction shell, drum, barrel, chamber or container 18, can be generally concentrically or coaxially positioned around the centrifuge receptacle 22, with an annular or circular space or gap 20 therebetween. This can provide space for molten solder 24*b* flowing radially outwardly from the centrifuge receptacle 22 to exit the holes 23 therein, strike or collect against the solder collection container 18 and flow downwardly by gravity. The solder collection container 18 can have a generally circular or cylindrical side or outer wall 18*a* and a flat bottom or end wall 18*b*, and can form a generally cup shaped solder collection container 18 nested around the centrifuge receptacle 22. The outer wall 18*a* can be formed of a thin walled metal tube or of sheet metal. The bottom 18*b* can be spaced apart from and below the bottom 22*b* of the centrifuge receptacle 22, to provide room for molten solder 24*b* to collect and flow. The bottom 18*b* of the solder collection container 18 can have a drain exit hole or outlet 26 for allowing the recovered molten solder 24*b* to flow into a desired external collection vessel. In some embodiments, bottom walls 22*b* and 18*b* can be angled, concave or convex.

A stationary generally cylindrical, circular, or annular insulated heater 14 can be generally concentrically or coaxially positioned around solder collection container 18, with an annular or circular space or gap 16 therebetween, for heating the centrifuge 12. This can include heating the solder collection container 18, the centrifuge receptacle 22, and the scrap pieces 24 within the centrifuge receptacle 22, and melting the solder 24*b* on the scrap pieces 24. The heater 14 can be enclosed within a generally circular or cylindrical shell 13, which can be formed of one tubular piece, or two or more joined pieces or halves as shown in FIGS. 7 and 8. A door, lid, cover or closure member 28 having a handle 28*a*, can cover the end of the centrifuge 12 and heater 14, as well as the open ends of the centrifuge receptacle 22, annular gap 20, solder collection container 18 and annular gap 16. Closure member 28 in one embodiment can sit on a curved lip 13*a* of shell 13 and can be insulated. In other embodiments, closure member 28 can be attached by hinges and/or secured with latches or fastener mechanisms. The annular gap 16 between the heater 14 and the solder collection container 18, as well as the annular gap 20 between the solder collection container 18 and the centrifuge receptacle 22, can allow air circulation to flow therein, which can provide for a generally uniform temperature distribution around the centrifuge receptacle 22. In some embodiments, the heater 14 can have heating elements and/or insulation below the bottom 18*b*, of the solder collection container 18, or at both ends, for providing additional heating and/or insulation.

Figure 5:
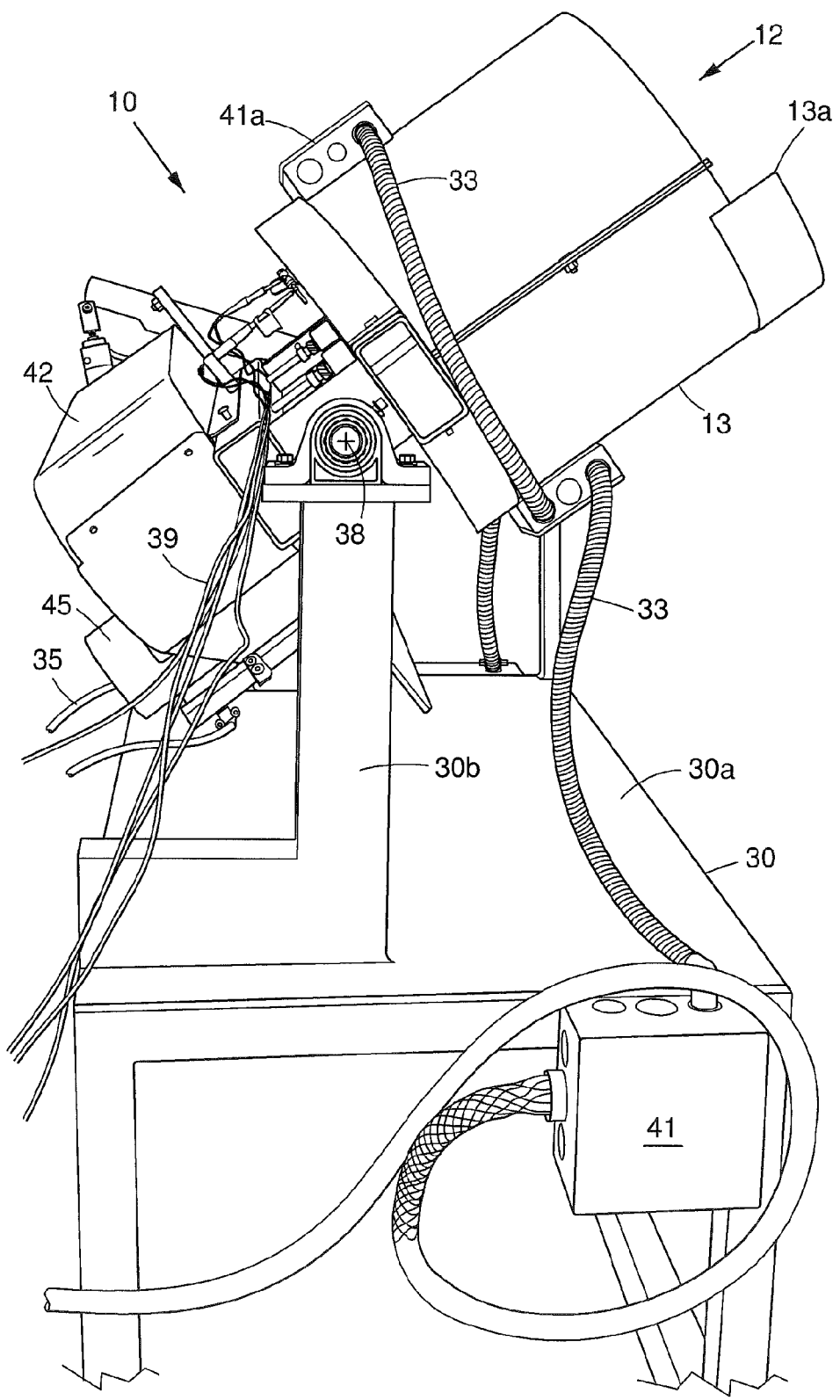
FIG. 5 is a left side perspective view thereof.
Figure 6:
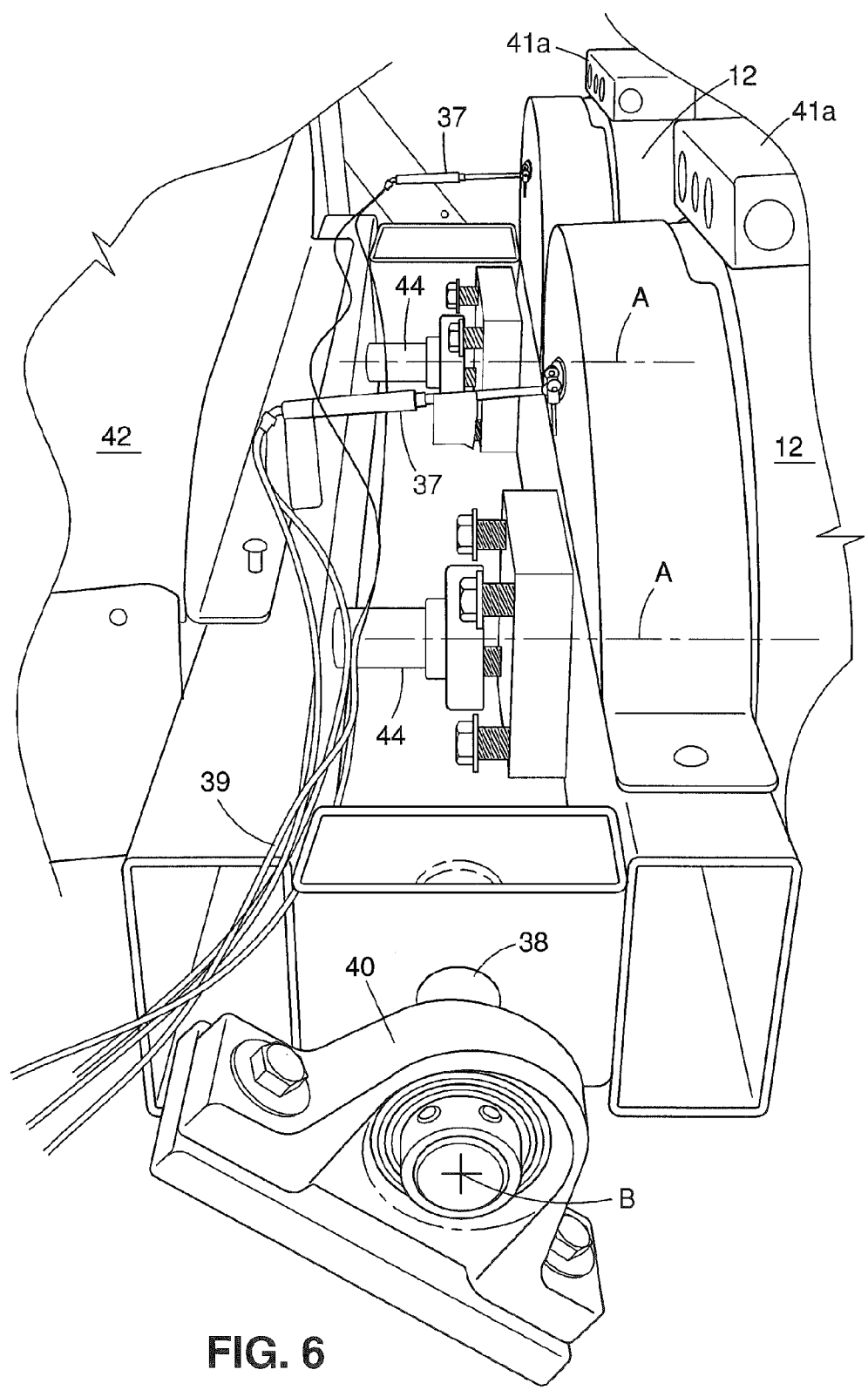
FIG. 6 is an enlarged view of a portion of the solder recovery unit in the region where the drive system is connected to the centrifuges.
Figure 11:
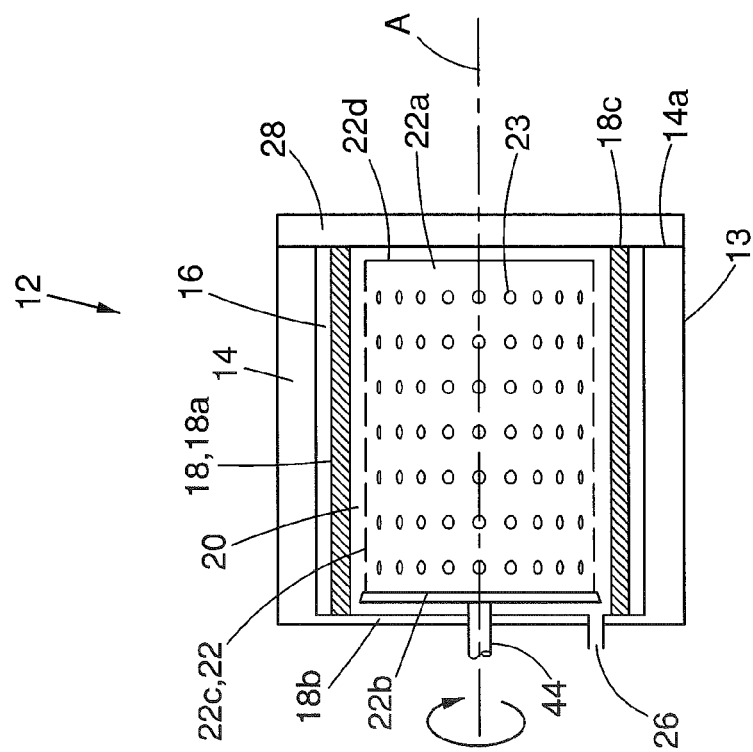
FIG. 11 is a side sectional view of one centrifuge in a horizontal orientation.

Referring to FIGS. 5 and 6, the two centrifuges 12 can be driven by a drive system 42 to rotate the two centrifuge receptacles 22 in opposite rotational directions, as shown by the arrows in FIG. 10, one clockwise and the other counterclockwise, for dynamic balancing. The drive system 42 can include a motor 45 and a suitable transmission, as known in the art, such as a chain driven transmission. In other embodiments, the transmission can be a gear or belt transmission, and either a single motor or two or multiple separate motors can be included. The drive system 42 can drive or rotate two rotary drive shafts 44, each of which can be coupled to a centrifuge receptacle 22, such as to the bottom wall 22*b*, for rotating the centrifuge receptacle 22 (FIGS. 6 and 11).

An electrical cabinet or power source 32 can provide electrical power to the heaters 14 via electrical lines 43, junction boxes 41, electrical lines 33 and junction boxes 41*a* (FIG. 1). Two temperature sensors such as thermocouples 37 (FIG. 6) can monitor the temperature within the centrifuges 12 or heaters 14, each for controlling the temperature of a centrifuge 12 or a heater 14. The thermocouples 37 can be electrically connected via lines 39 to temperature control box 32*a* (FIGS. 1 and 6). A motor controller 34 can be electrically connected to motor 45 via line 35 and include a control panel, knob or dial 34*a* for controlling the speed of the motor 45 and the rotational speed of the centrifuge receptacles 22.

Figure 4:
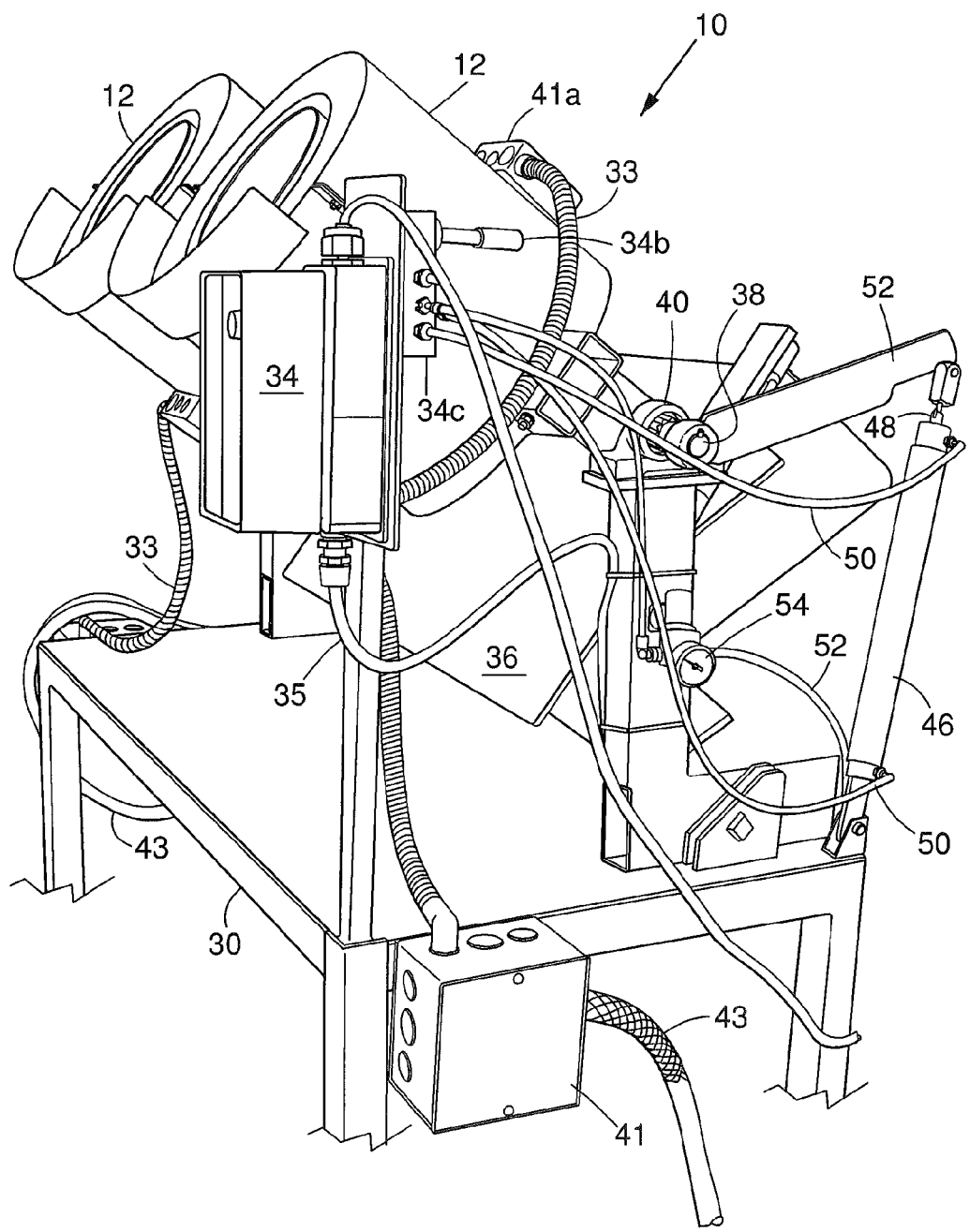
FIG. 4 is a right side perspective view of the solder recovery unit of FIG. 1.

Referring to FIG. 4, one shaft 38 can extend from the pivoting frame 36 along axis B through a bearing 40 and can be secured to one end of a pivot arm 52. The opposite or other end of the pivot arm 52 can be secured to an extendable and retractable piston rod 48 of a pneumatic cylinder 46. Pneumatic lines 50 can be connected between the pneumatic cylinder 46 and a pneumatic controller 34*c* for controlling operation of the pneumatic cylinder 46. Retracting the piston rod 48 can pivot or position the pivoting frame 36 about axis B to position the centrifuges 12 to face upwardly at an angle θ, such as 45° to horizontal, and extending the piston rod 48, can pivot or position the frame 36 and centrifuges 12 about axis B to face horizontally, or at an angle θ downwardly, such as 45° depending upon the amount of extension (FIGS. 11-15). A control lever 34*b* extending from the pneumatic controller 34*c* can control the operation of the pneumatic controller 34*c* and pneumatic cylinder 46. Compressed air can be provided to the pneumatic controller 34*c* via pneumatic line 50 and pressure regulator 54. In some embodiments, a motor can be used to pivot the pivoting frame 36.

In one embodiment, the centrifuge receptacle 22 can be about 7 inches in diameter, about 10 inches in height or longitudinal length along axis A, and have an outer wall 22*c* that is about 0.04 inches thick. The holes 23 in the centrifuge receptacle 22 can have a diameter of about 1/16 inches, and can be separated from each other about 3/16 inches, center to center. Each centrifuge receptacle 22 of this size can contain about 10 lbs. of scrap pieces 24 when ½ full. Annular gap 20 can be about ½ inches to 1¼ inches in width. Solder collection container 18 can be about 8¼ inches in diameter and have an outer wall 18*a* about ⅛ inches thick. The rim at the open end 18*c* of the solder collection container 18 can extend slightly beyond the rim at the open end 22*d* of the centrifuge receptacle 22, for example, about 1/32 to 1 inches, often about 1/16 to ½ inches, for spacing the centrifuge receptacle 22 from closure member 28 for rotational clearance. In some embodiments, the centrifuge receptacle 22 can have an openable lid or upper end wall. Annular gap 16 can be about 1 inch to 1½ inches in width. The insulated heater 14 can be about 14 inches in diameter and have about a 2 inch to 2½ inch annular width. As seen in FIG. 8, variations in the sizes, shapes, positioning, roundness, etc., of components can cause variations in the width of the annular gaps 16 and 20 at various locations moving in a circular direction, but the nested components can still be considered generally concentric or coaxial. The face or rim 14*a* at the open end of the heater 14 can be at the same level as the rim at the open end 18*c* of the solder collection container 18 for engaging and/or sealing against closure member 28. The heater 14 can be set to heat the interior of the centrifuge 12, such as at the solder collection container 18, to about 650° F. It is understood that the temperature can vary depending upon the melting point of the solder composition being melted.

Figure 12:
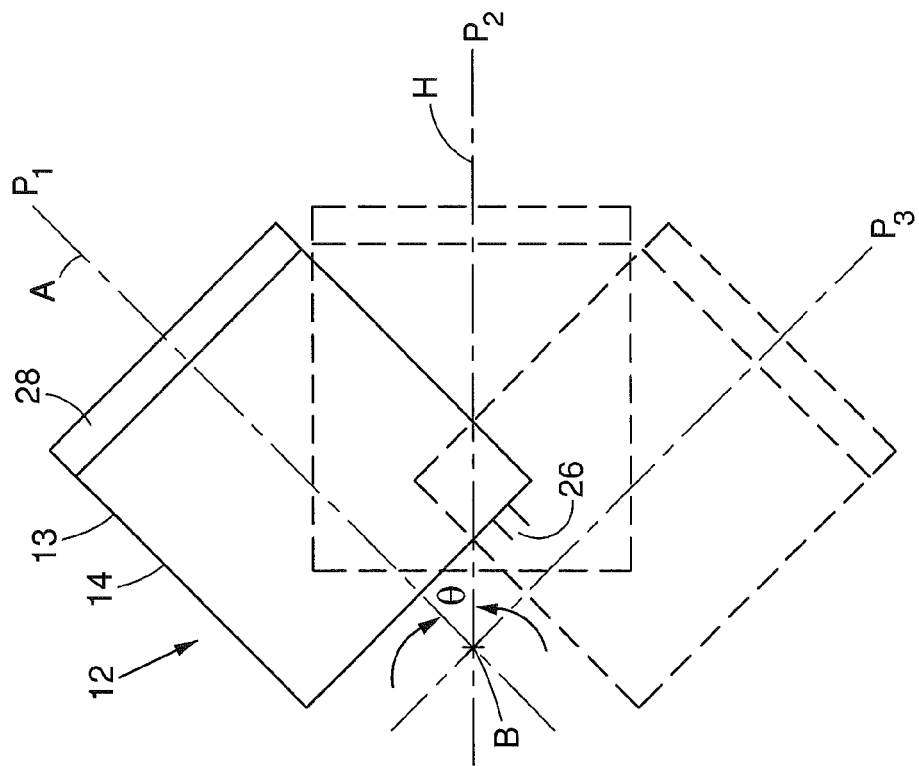
FIG. 12 is a schematic drawing showing a centrifuge in an upwardly oriented position, and also showing horizontal and downwardly oriented positions.

The pivoting frame 36, the pneumatic controller 34*c* and the pneumatic cylinder 46 can be configured for positioning the centrifuges 12 and their centrifuge axes A in three positions $P_1$, $P_2$ and $P_3$ (FIG. 12). Position $P_1$ orients or positions each centrifuge 12 so that the open end or rim 22*d* of the centrifuge receptacle 22 is facing upwardly, and the centrifuge axis A is at an upward angle θ to horizontal, such as at about 45°. Position $P_2$ positions each centrifuge 12 so that the open end or rim 22*d* of the centrifuge receptacle 22 faces laterally or horizontally, and the centrifuge axis A is oriented along or aligned about with horizontal. Position $P_3$ positions each centrifuge 12 so that the open end or rim 22*d* of the centrifuge receptacle 22 faces downwardly, and the centrifuge axis A is at a downward angle θ to horizontal, such as at 45°. If desired, positions $P_1$ and $P_3$ can be at other angles, and can be 90° to horizontal.

The motor controller 34, motor 45, and drive system 42 can be configured to rotate each centrifuge receptacle 22 at about 400 to 430 RPM while in position $P_1$, often at about 400 RPM while at a 45° angle, and to rotate each centrifuge receptacle 22 at about 15 to 30 RPM while in horizontal position $P_2$, often at about 20 RPM. A centrifuge receptacle 22 of 7 inches in diameter rotating at 400 to 430 RPM, can have a circumference of 22 inches and an RPM:diameter (inches) ratio of about 57:1 to 61:1, with a surface speed at the outer perimeter of about 12.3 ft/sec (147 in/sec) to 13 ft/sec (157 in/sec), and a radial, or centripetal acceleration $V^2/r$ of about 518 ft/sec$^2$ to 579 ft/sec$^2$. A centrifuge receptacle 22 having such a diameter rotating at 15 to 30 RPM, can have a RPM:diameter (inches) ratio of about 2:1 to 4.3:1, with a surface speed at the outer perimeter of about 0.45 ft/sec (5.5 in/sec) to 0.92 ft/sec (11 in/sec), and a radial acceleration $V^2/r$ of about 0.7 ft/sec$^2$ to 2.9 ft/sec$^2$, and when rotating at 20 RPM, can have a RPM:diameter (inches) ratio of about 2.8:1, with a surface speed at the outer perimeter of about 0.61 ft/sec (7.3 in/sec) and a radial acceleration of about 1.2 ft/sec$^2$.

Figure 16:
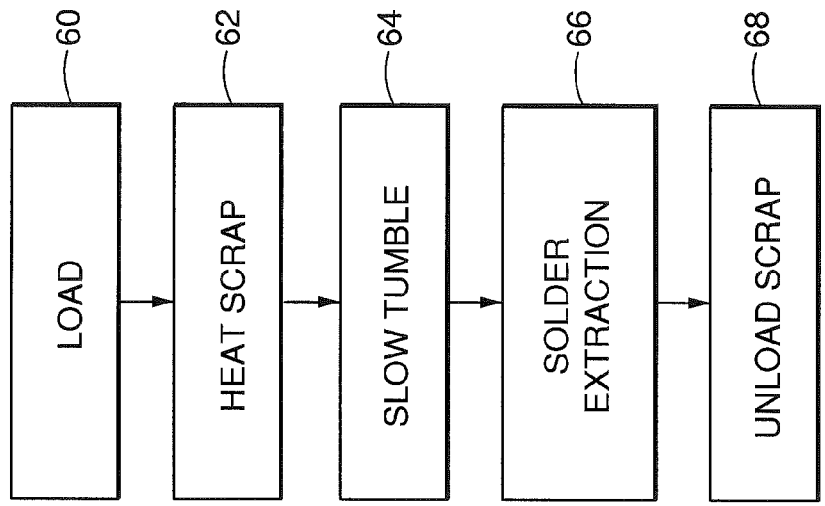
FIG. 16 is a flow chart of an embodiment of a process for extracting solder from scrap.
Figure 13:
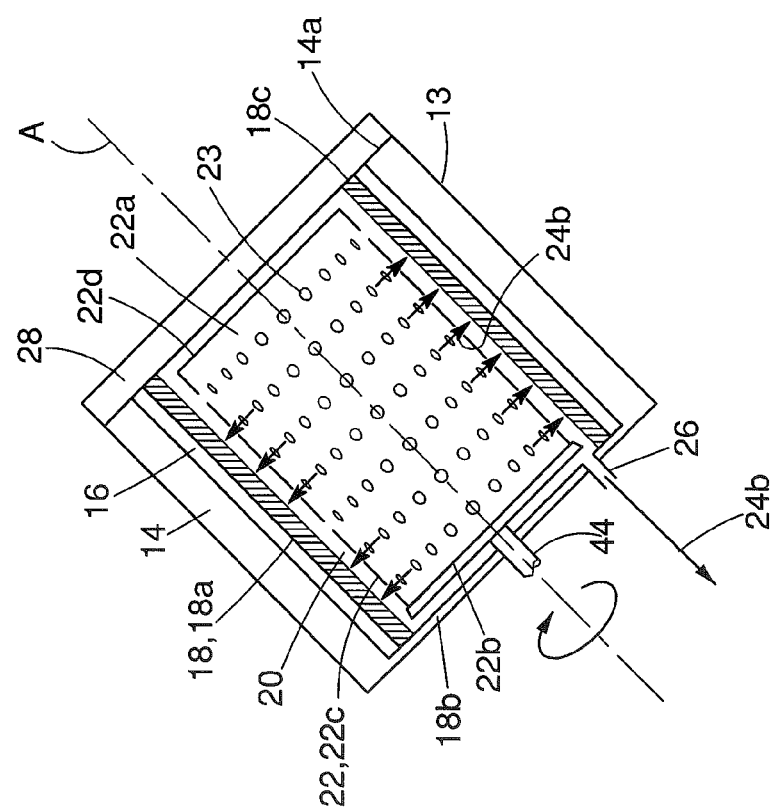
FIG. 13 is a side sectional drawing of one centrifuge extracting molten solder.
Figure 14:
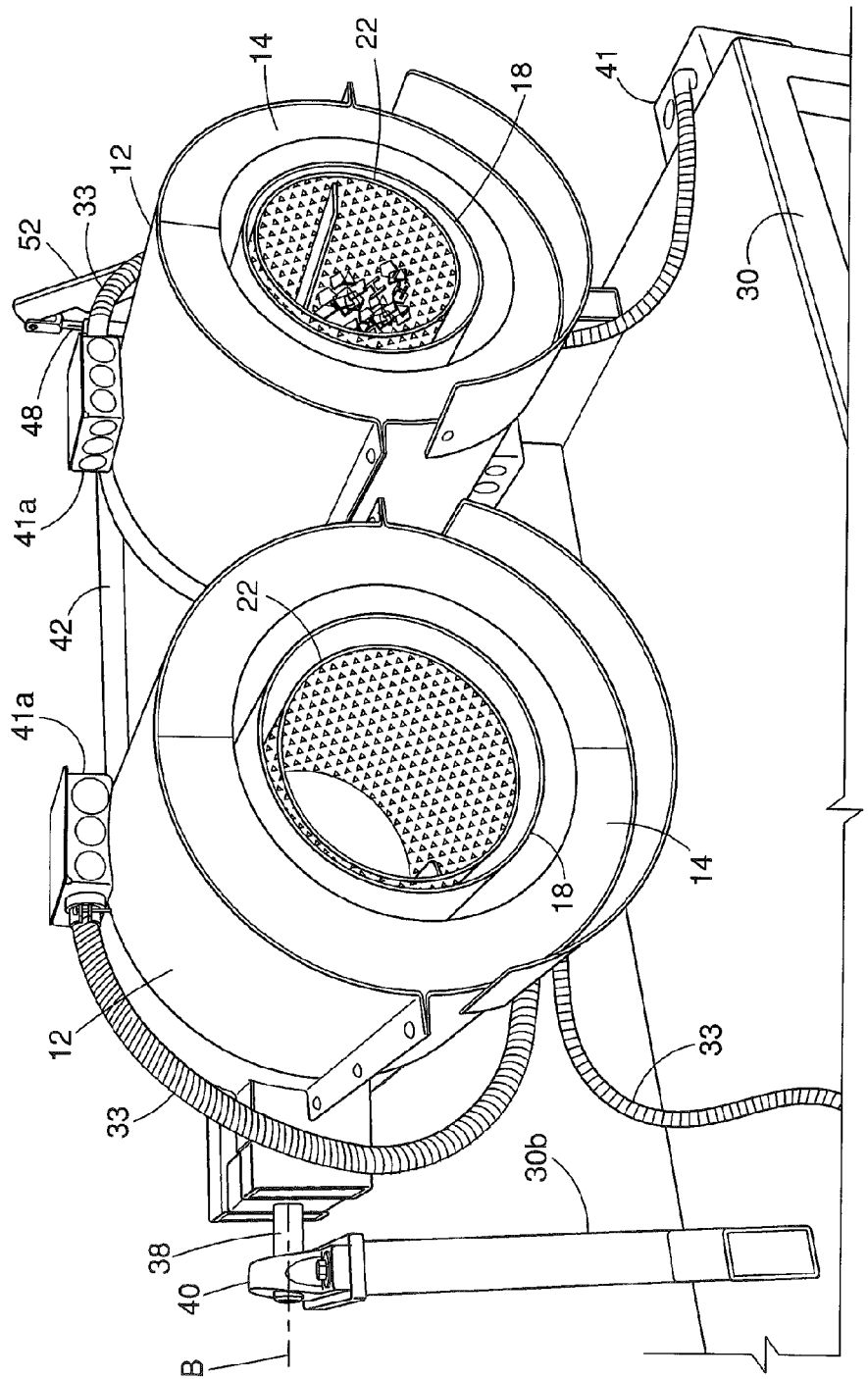
FIG. 14 is a front perspective view of the centrifuges positioned in a horizontal orientation.
Figure 15:
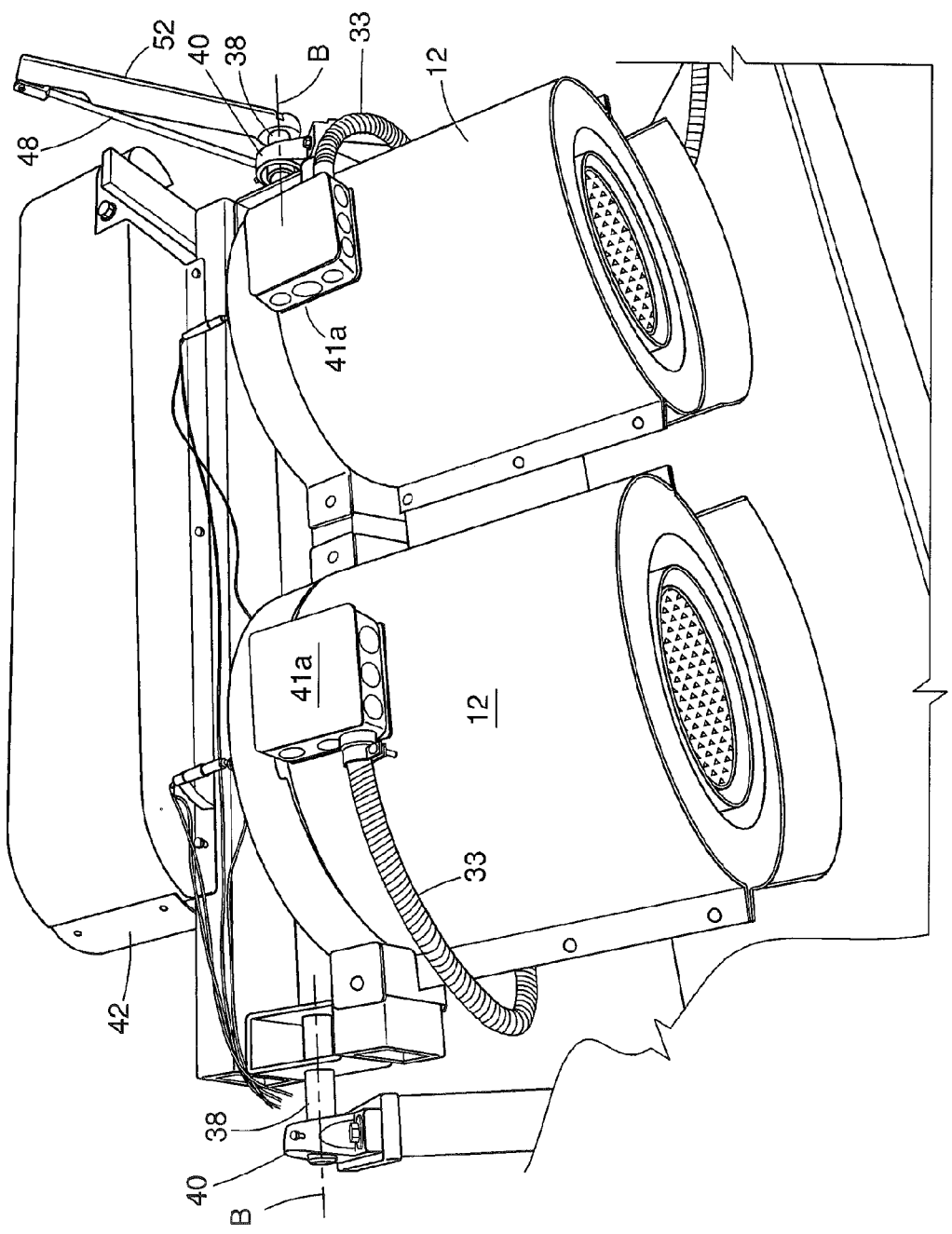
FIG. 15 is a front perspective view of the centrifuges positioned in a downwardly oriented position.

In use, a quantity of scrap pieces 24 such as seen in FIG. 2, can be first prewashed with hot water and detergent, at about 140° F., and rinsed with clean water to clean the scrap pieces 24 from contaminants. The scrap pieces 24 can be dried, for example by spin drying. Referring to FIG. 16, in Step 60, the interior 22*a* of the centrifuge receptacle 22 of each centrifuge 12 can be loaded about half full with pieces of cleaned solder coated scrap 24 while the rim of the open end 22*d* of the centrifuge receptacle 22 is facing upwardly, such as when in position $P_1$ with the centrifuge axis A being at an angle θ, such as 45°. Once filled, the closure members 28 can be positioned in a closed manner, to enclose the interior, of each centrifuge 12.

In Step 62, the scrap pieces 24 can be heated to melt the solder 24*b* thereon, with the interior of the centrifuge 12 heated to about 650° F. This can be accomplished by rotating each centrifuge 12 while in position $P_1$, at a high speed of about 400 to 430 RPM, such as 400 RPM, to centrifugally move the scrap pieces 24 against the outer wall 22*c* of the centrifuge receptacle 22 in a tightly packed annular manner, not only to be radially closer to the annular heater 14, but to provide better heat transfer to the scrap pieces 24. Scrap pieces 24 annularly packed against the outer wall 22*c* can be heated by the outer wall 22*c* by conduction, and tightly packing the scrap pieces 24 to each other by centrifugal force can provide more efficient heat transfer to each other by conduction against each other. If desired, the centrifuges 12 can be initially oriented horizontally to obtain a more even distribution of the scrap pieces 24 along the longitudinal length of the centrifuge receptacles 22, for maximum surface area exposure to the heaters 14, and then moved to position $P_1$ to face upwardly so that the scrap pieces 24 do not hit the closure member 28. In other embodiments, the closure member 28 can be constructed to withstand high speed rotation and heating while the centrifuge 12 is in a horizontal orientation, or the centrifuge receptacle 22 can have its own lid. It is also possible to heat the scrap pieces 24 while the centrifuge 12 is in a horizontal orientation with the centrifuge receptacle 22 rotated slowly, but the heating process is typically slower. The centrifuge receptacles 22 can be rotated in opposite rotational directions, one clockwise, the other counterclockwise for dynamic balancing. Heating in Step 62 can last about 1-3 minutes, such as about 2 minutes, once the centrifuge 12 is up to temperature.

Once the scrap pieces 24 are heated sufficiently to heat and melt the solder 24b thereon, the centrifuge receptacle 22 of each centrifuge 12 can be moved or positioned into position $P_2$ to be horizontally oriented so that the centrifuge axis A is close to or along horizontal or lateral axis H. In Step 64, with the closure member 28 in place, each centrifuge receptacle 12 can be rotated slowly at about 15 to 30 RPM, such as at about 20 RPM, to slowly tumble the scrap pieces 24 within each centrifuge receptacle 22 (FIGS. 10-12). The slow tumble is conducted at a speed that can bring the scrap pieces 24 rotationally upward until reaching the uppermost or vertical top or apex of the curve in the horizontally oriented centrifuge receptacle 22, and then fall with gravity downwardly, as shown in FIG. 10. At least one or more longitudinal baffles 25 that are directed radially inward can carry scrap pieces 24 upwardly and then direct the scrap pieces 24 downward to or towards the bottom curve of the horizontally oriented centrifuge receptacle 22, to cause the scrap pieces 24 to strike, rub, scrape or move against each other, in an agitating, tumbling and mixing manner. This can cause melted solder 24b on certain scrap pieces 24 to change or break the surface tension that tends to hold or adhere the solder 24b to their host scrap pieces 24, causing at least portions of melted or molten solder 24b to leave host scrap pieces 24 and combine together in larger quantities, drops or volumes. By having each centrifuge receptacle 22 in a horizontal or generally horizontal orientation, the scrap pieces 24 can be tumbled along the full longitudinal length of the centrifuge receptacle 22, forming a maximum tumbling volume and surface for scrap pieces 24 to engage each other while tumbling, to combine drops or quantities of molten solder 24b together, that touch or come into contact with each other with surface tension attraction, which can form larger drops or quantities of molten solder 24b. In addition, this also spreads the scrap pieces 24 evenly out for optimum or maximum heating by heater 14. The slow tumble of Step 64 can last about 1-3 minutes, such as about 2 minutes.

In Step 66, each centrifuge 12 and centrifuge receptacle 22 can be moved back to an upwardly facing orientation, such as position $P_1$, and rotated at a high speed of about 400 to 430 RPM, such as about 400 RPM, which is a rotational speed large enough to centrifugally extract or force molten solder 24b radially outwardly from the centrifuge receptacle 22 through holes 23 (FIG. 13) for collection within the solder collection container 18 and in the annular gap 20 between the centrifuge receptacle 22 and the solder collection container 18. When the centrifuge 12 is at an angle θ, such as 45°, molten solder 24b can flow to the solder outlet 26 at the bottom 18b of the solder collection container 18 next to the outer wall 18a, and exit the centrifuge 12 for collection in a desired location or container since both the outer wall 18a and the bottom wall 18b are positioned in sloped orientations. Step 66 can last about 1-3 minutes, such as about 2 minutes. Sloping both the outer wall 18a and the bottom wall 18b at 45° can allow or direct generally consistent or even flow of molten solder 24b from both walls to the solder outlet 26. The use of the slow tumble in Step 64 prior to Step 66 can in some embodiments double the amount of molten solder 24b extracted in Step 66, in comparison to moving straight from the heating Step 62 to the extraction in Step 66. The slow tumble in Step 64 causes quantities of molten solder 24b to combine with each other into larger amounts than if merely heating the scrap pieces 24, which can allow the centrifugal forces at the high rotational speed in Step 66 to more easily centrifugally extract the larger and heavier volumes of molten solder 24b, at least portions of which can remain held together by surface tension, through the scrap pieces 24 and the holes 23.

In Step 68, the scrap pieces 24 can be unloaded from each centrifuge receptacle 22 by opening closure members 28 and moving each centrifuge 12 into position $P_3$ (FIGS. 12 and 15), where the centrifuge axis A is positioned at an angle θ downwardly, for example, downwardly at about 45°, to dump the scrap pieces 24 out. The centrifuges 12 can then be repositioned into position $P_1$ for a new load of scrap pieces. In example embodiments of the present invention, depending upon the type of scrap, in some cases about 20 lbs. of scrap pieces 24 can yield about 1 lb. of recovered solder 24b. This can be advantageous for recovering expensive non-lead solder compositions, for example, those containing high indium content.

While this invention has been particularly shown and described with references to example embodiments thereof, it will be understood by those skilled in the art that various changes in form and details may be made therein without departing from the scope of the invention encompassed by the appended claims.

For example, although certain dimensions, shapes, speeds and orientations have been described, these can be varied depending upon the situation at hand. For example, the size of the centrifuges 12 can be increased, and polygonal or complex curve shapes can used for the nested components therein. It is possible that larger diameter centrifuge receptacles 22 can be rotated at different rotational speeds in positions $P_1$ and $P_2$ than described for the 7 inch diameter centrifuge receptacle 22. In some embodiments, the centrifuge receptacle 22 and axis A can be kept in a horizontal orientation, with the centrifuge receptacle 22 having its own lid to prevent scrap pieces 24 from falling out, and the outer wall 18a of the solder collection container 18 can have sloped bottom surfaces for directing molten solder 24b to an appropriately located solder outlet 26. The centrifuge receptacle 22 can be loaded and unloaded through lids or doors in either the end walls, or the outer wall 18a. In some embodiments, the scrap pieces 24 can have a nonmetallic base material, for example, ceramics, glass, high temperature polymers or composites.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A method for recovering solder from solder coated scrap pieces, comprising the steps of:
   containing a quantity of solder coated scrap pieces within a centrifuge receptacle of a first centrifuge, the centrifuge receptacle has perforation holes and is rotatably mounted about a first centrifuge axis, a solder collection container surrounds the centrifuge receptacle;
   heating the solder coated scrap pieces and melting the solder thereon with a heater surrounding the solder collection container;
   rotating the centrifuge receptacle with a drive system at a low speed while the first centrifuge axis is in about a horizontal position, thereby causing the scrap pieces to tumble along a longitudinal length of the centrifuge receptacle; and rotating the centrifuge receptacle with the drive system at a high speed, thereby centrifugally extracting molten solder from the centrifuge receptacle through the perforation holes into the solder collection container.

2. The method according to claim 1, further comprising the step of forming the centrifuge receptacle to be generally cylindrical, the solder collection container being generally cylindrical and generally coaxially positioned around the centrifuge receptacle, and the heater being generally cylindrical and generally coaxially positioned around the solder collection container, the solder collection container and the heater being both stationary.

3. A method for recovering solder from solder coated scrap pieces, comprising the steps of:
containing a quantity of solder coated scrap pieces within a centrifuge receptacle of a first centrifuge, the centrifuge receptacle has perforation holes and is rotatably mounted about a first centrifuge axis, a solder collection container surrounds the centrifuge receptacle;
heating the solder coated scrap pieces and melting the solder thereon with a heater surrounding the solder collection container;
with a drive system, rotating the centrifuge receptacle while the first centrifuge axis is in about a horizontal position at a low speed and tumbling the scrap pieces along a longitudinal length of the centrifuge receptacle, and later rotating the centrifuge receptacle at a high speed for centrifugally extracting molten solder from the centrifuge receptacle, radially outwardly through the perforation holes into the solder collection container; and
pivoting the first centrifuge and the first centrifuge axis between desired positions with a pivoting frame to which the first centrifuge is mounted.

4. The method according to claim 3, further comprising the step of forming the centrifuge receptacle to be generally cup shaped for receiving the quantity of solder coated scrap pieces through an open end, the pivoting frame capable of pivoting the first centrifuge between a first position where the open end of the centrifuge receptacle faces upwardly, and a second position where the open end of the centrifuge receptacle and the first centrifuge axis are in about a horizontal orientation.

5. The method according to claim 4, further comprising the step of draining molten solder collected within the solder collection container through a solder outlet at a bottom of the solder collection container.

6. The method according to claim 5, further comprising the step of rotating the centrifuge receptacle at about 15-30 RPM while the first centrifuge axis is in about the horizontal position, and then rotating the centrifuge receptacle at about 400-430 RPM while the first centrifuge axis is at about 45° to horizontal.

7. The method according to claim 4, further comprising the step of pivoting the first centrifuge to a third position where the open end of the centrifuge receptacle is facing downwardly, for dumping the scrap pieces from the centrifuge receptacle.

8. The method according to claim 4, further comprising closing off the open end of the centrifuge receptacle with an openable closure member.

9. The method according to claim 3, further comprising the step of providing a second centrifuge mounted to the pivoting frame comprising a centrifuge receptacle having perforation holes, rotatably mounted about a second centrifuge axis for containing and rotating a second quantity of solder coated scrap pieces, a solder collection container surrounding the centrifuge receptacle, and a heater surrounding the solder collection container for heating the second quantity of solder coated scrap pieces and melting the solder thereon, the drive system rotating the centrifuge receptacle of the second centrifuge in a direction opposite to the centrifuge receptacle of the first centrifuge, for dynamic balancing.

10. The method according to claim 1 further comprising the step of directing scrap pieces to fall downwardly when the centrifuge receptacle is rotated at the low speed while the first centrifuge axis is in about a horizontal orientation with at least one radially inwardly directed baffle within the centrifuge receptacle.

11. The method according to claim 10 further comprising the step of forming the perforation holes in the centrifuge receptacle about $1/16$ inches in diameter and about $3/16$ inches apart from each other.

12. A method for recovering solder from solder coated scrap pieces comprising the steps of:
containing a quantity of solder coated scrap pieces within a generally cylindrical centrifuge receptacle of a first centrifuge, the centrifuge receptacle has perforation holes and is rotatably mounted about a first centrifuge axis, a stationary generally cylindrical solder collection container is generally coaxially positioned around the centrifuge receptacle;
heating the solder coated scrap pieces and melting the solder thereon with a stationary generally cylindrical heater generally coaxially positioned around the solder collection container;
pivoting the first centrifuge between one position where the first centrifuge axis is in about a horizontal position, and another position where the first centrifuge axis is at about 45° to horizontal, with a pivoting frame to which the first centrifuge is mounted; and
with a drive system, rotating the centrifuge receptacle at about 15-30 RPM while the first centrifuge axis is in about the horizontal position and tumbling the scrap pieces along a longitudinal length of the centrifuge receptacle, and later rotating the centrifuge receptacle at about 400-430 RPM while the first centrifuge axis is at about 45° to horizontal for centrifugally extracting molten solder from the centrifuge receptacle, radially outwardly through the perforation holes into the solder collection container.

13. The method according to claim 1, wherein at the low speed the radial acceleration at an outer perimeter of the centrifuge receptacle is less than 0.09 g and at the high speed the radial acceleration at the outer perimeter of the centrifuge receptacle is greater than 16.2 g.

14. The method according to claim 3, wherein at the low speed the radial acceleration at an outer perimeter of the centrifuge receptacle is less than 0.09 g and at the high speed the radial acceleration at the outer perimeter of the centrifuge receptacle is greater than 16.2 g.

15. The method according to claim 12, wherein at the low speed the radial acceleration at an outer perimeter of the centrifuge receptacle is less than 0.09 g and at the high speed the radial acceleration at the outer perimeter of the centrifuge receptacle is greater than 16.2 g.

* * * * *